(12) United States Patent
McCoy et al.

(10) Patent No.: US 10,486,612 B2
(45) Date of Patent: Nov. 26, 2019

(54) ENCASEMENT PROTECTIVE APPARATUS

(71) Applicants: Earl McCoy, Colorado Springs, CO (US); Graham McCoy, Colorado Springs, CO (US)

(72) Inventors: Earl McCoy, Colorado Springs, CO (US); Graham McCoy, Colorado Springs, CO (US)

(*) Notice: Subject to any disclaimer, the term of this patent is extended or adjusted under 35 U.S.C. 154(b) by 0 days.

(21) Appl. No.: 16/167,561

(22) Filed: Oct. 23, 2018

(65) Prior Publication Data
US 2019/0054862 A1 Feb. 21, 2019

Related U.S. Application Data

(63) Continuation-in-part of application No. 29/602,542, filed on May 1, 2017.

(51) Int. Cl.
  B60R 9/08 (2006.01)
  B60R 9/055 (2006.01)
  A01K 97/08 (2006.01)

(52) U.S. Cl.
  CPC .............. B60R 9/08 (2013.01); B60R 9/055 (2013.01); A01K 97/08 (2013.01)

(58) Field of Classification Search
  CPC .......... A01K 97/08; A01K 97/06; B60R 9/08; B60R 9/055; B60R 9/04
  See application file for complete search history.

(56) References Cited

U.S. PATENT DOCUMENTS

| | | | | |
|---|---|---|---|---|
| 2,640,622 A * | 6/1953 | Sabatino | ............... | A01K 97/08 220/521 |
| 2,902,790 A * | 9/1959 | Harvey | ................... | A01K 97/08 43/26 |
| 3,772,819 A * | 11/1973 | Ratzlaff | ................. | A01K 97/08 43/26 |
| 4,858,366 A * | 8/1989 | Rushton | ................. | A01K 97/08 43/26 |
| 4,967,504 A * | 11/1990 | Craft | ...................... | A01K 97/08 43/26 |
| 6,283,288 B1 * | 9/2001 | Rich | ....................... | A01K 97/06 206/315.11 |
| 2002/0073603 A1* | 6/2002 | Lefeve | ................... | A01K 97/08 43/26 |
| 2013/0255132 A1* | 10/2013 | Sela | ........................ | F41C 33/06 43/26 |

(Continued)

Primary Examiner — Corey N Skurdal
(74) Attorney, Agent, or Firm — Roger A. Jackson

(57) ABSTRACT

A protective apparatus for an article, the apparatus including a rigid surrounding sidewall with first and second end portions, the sidewall has a chamber disposed within a primary interior of the sidewall that has a flexible partition member disposed between the sidewall and the chamber to dampen relative movement between the rigid sidewall and the chamber. Further, a flexible collar that is slidably engaged to a portion of an interior of the chamber, the flexible collar has a collar aperture that removably encompasses a portion of the article, wherein operationally the collar suspends the article within the chamber interior. Further, a head element is affixed to the sidewall second end portion and a hatch that has a removable engagement to the sidewall first end portion wherein both the head element and the hatch are operational to retain the article within the chamber in the sidewall.

20 Claims, 13 Drawing Sheets

(56) References Cited

U.S. PATENT DOCUMENTS

| | | | |
|---|---|---|---|
| 2015/0021871 A1* | 1/2015 | Thornberg | A01K 97/08 280/47.26 |
| 2015/0313200 A1* | 11/2015 | Tannahill | A01K 97/06 43/26 |
| 2016/0128312 A1* | 5/2016 | Siebert | A01K 97/08 43/26 |
| 2019/0230911 A1* | 8/2019 | Smigaj | A01K 97/08 |

* cited by examiner

ENCASEMENT PROTECTIVE APPARATUS

RELATED PATENT APPLICATION

This is a continuation in part (CIP) patent application of U.S. design patent application Ser. No. 29/602,542 filed on May 1, 2017 by Earl McCoy and Graham McCoy both of Colorado Springs, Colo., US.

FIELD OF THE INVENTION

The present invention generally relates to protective covers and cases for articles. More particularly, the present invention discloses protective covers for fishing rod and reel assemblies, that are long, thin, and cylindrical in nature for the rod portion of the article, wherein the end of the rod has attached to it the reel that relative to the rod is significantly larger causing some challenges in designing a protective case for the rod and reel combination in conjunction with mounting the protective case on a vehicle especially due to the excessive length required of the case due to the long thin nature of the rod and reel assembly. The rod and reel combination by its extremely long/thin aspect ratio nature can be somewhat fragile due to having a relatively thin cross section to its length and width and further given that during the transportation phase, the rod and reel can be frequently loaded with dynamic forces from the vehicles motion that can increase the opportunity for damage to the rod and reel due to the soft flex nature of the rod with the relatively heavy reel that would cause a bending moment at the interface of the rod and reel.

Another complication is the plurality of rod line guide eyelets that extend roughly perpendicularly from a lengthwise axis of the rod, these eyelets are also very fragile by their nature of being thin in construction and extending outward from the rod in a cantilever fashion making the eyelets easily damaged. Thus there is a challenge in protecting both the rod and eyelets especially due to the uneven support surfaces that exist on the rod, eyelets, and reel.

DESCRIPTION OF THE RELATED ART

Up until now there have been relatively moderate efforts in designing and manufacturing a fully engineered hard protective cover for rod and reel assemblies, as a number of the current protective covers available for rod and reel assemblies to the consumer appear to be design afterthoughts in that they are nothing any more special than a typical fabric cover, or having plastic construction. The typical protective cover has a zippered enclosure with a soft foam padded lining with a nylon type fabric cover, wherein the protective cover loosely fits around the rod and reel assembly. The current other protective cover materials available are typically various forms of corrugated cardboard, bubble wrap, or sheet foam padding that at the very best only moderately protect the rod and reel assembly, this being primarily due to the packaging and protective cover materials being inherently soft and flexible and also fitting haphazardly fitting around the uneven outer surface of the rod and reel assembly in a very loose manner, additionally due to the protective cover attempting to fit a wide variety of rod and reel sizes.

What this typically results in that the cover firstly will not have any structural rigidity to resist any sort of point impact to protect the rod and reel, and secondly with the relative movement being allowed to the rod and reel within the cover during the normal vehicle movement inertia loads, the rod and reel will tend to bang around especially on its outer extended items like the eyelets against the inside of the protective cover allowing potential further damage to the eyelets and again causing potential damage to the potential break point between the rod and reel, this is especially critical in that this shifting of the rod and reel within the protective cover during transit is highly cyclical, i.e. occurring numerous times (in the thousands), thus the aforementioned damage can become cumulative in nature.

Therefore, two very basic desirable things come to light to maximize the shipping and transport protection given to the rod and reel assembly. The first desirable thing is "structural rigidity", in other words the protective cover should be able to handle a point load impact and be able to handle a bending load imposed upon the rod and reel along its longest axis from end to end. Wherein the aforementioned point load impact and bending load are placed upon the exterior of the protective cover, the protective cover would have the rigidity to absorb the brunt of this external loading by being its own rigid structure, thus not transmitting these external protective cover loads to the rod and reel itself. The second desirable thing for the protective cover is to have a very snug and close-fitting fit to the exterior surfaces of the rod and reel, that absolutely minimizes the relative movement of the rod and reel within the protective cover during transport or shipment. As this snug fitting concept will go a long way toward preventing the previously described high-frequency occurrence and cumulative damage to the exterior surfaces of the rod and reel assembly.

The well known problem to accomplishing the above two mentioned things for a protective cover typically requires a totally custom made hard shell enclosure that has an interior that is also custom fit to the external surface of the rod and reel, as is typically used in specialized cases made for high value electronic equipment that is frequently shipped or transported frequently. To address one of these two things, the prior art in differing art areas has used air pressure to create temporary rigidity in structures, wherein as long as the air negative or positive pressure remains in place the normally flexible structure is rigid, with the structure becoming flexible once again when the air negative or positive pressure returns to atmospheric pressure. To address the close fitting requirement, the prior art has had solutions that are permanent, such as expandable polyurethane foam, that can certainly precisely encase an article's unique external shape for shipping without any relative movement of the article in the foam casing, however, the foam casing being permanent and not reusable, thus being acceptable for one time shipping from factory to user, however, not being acceptable for multiple transport scenarios, where the rod and reel is transported multiple times to its site of usage.

Starting in the prior art for a semi rigid type case apparatus with U.S. Pat. No. 5,576,307 to Frydenberg disclosed is a sliding latch for a molded plastic container that has first and second portions which are relatively movable between open and closed configurations; and the two portions have first edges which are juxtaposed when the portions are closed. Further in Frydenberg a T-shaped rail is fixed to the first edge of one of the container portions, and the rail extends along the edge for a significant length-except for a location where it is interrupted by two adjacent gaps. In Frydenberg a pair of posts are fixed to the first edge of the second container portion, and the posts are positioned so as to be insertable into the two rail gaps when the two container portions are in their closed configuration. The posts in Frydenberg have a transverse configuration which matches the transverse configuration of the rail, so that the posts may be described as forming geometric extensions of the rail when the two container portions are closed. A slide in Frydenberg has an interiorly facing opening which is sized for engaging the rail and for being captured thereby, further the slide has a first position at which the pair of posts are free to move transversely with respect to the rail, such that the two container portions may be opened; and the slide has a second position at which it completely envelops the two posts and at least a portion of the rail. In its second position in Frydenberg the slide precludes opening of the container by virtue of preventing transverse movement of the posts with respect to the rail.

Continuing in the prior art for air rigid apparatus in U.S. Pat. No. 8,387,789 to Baker disclosed is a protective apparatus for an article, the apparatus including a surrounding sidewall having a first end portion and an opposing second end portion, the sidewall also having a perpendicularly oriented first margin portion and an opposing second margin portion, also with a primary interior. The interior in Baker includes a plurality of first and second chambers that are intersticed in position to one another, in addition, included is a plurality of particulate items loosely disposed within each of the first and second chambers and a structure for removable engagement positioned adjacent to the first and second margins. The removable engagement structure in Baker facilitates the first and second margins to be removably engaged allowing the surrounding sidewall to envelope the article, wherein the primary interior can be evacuated, thus removing the air spaces between the particulate items and in the interior resulting in rigidifying the surrounding sidewall, thus protecting the article.

Also in the prior art for semi rigid case type protection structures, in U.S. Pat. No. 4,967,504 to Craft wherein the present invention is directed toward providing an improved holder or case for a fishing reel and fishing rod. The concept of the present invention in Craft is to provide a strong, rigid holder that a fishing rod with a fishing reel attached thereto can be easily inserted into for protection during transport and storage, to prevent the fishing rod and fishing reel from becoming tangled with other fishing rods and fishing reels, etc. In Craft, the holder of the present invention includes an elongated tube having a hollow interior for receiving a rod portion of a fishing rod, the tube having a first end and a second end; and a body having a hollow interior for receiving a fishing reel and at least a portion of a handle portion of the fishing rod; the body having a first end and a second end; the first end of the body being attached to the first end of the tube with the hollow interior of the body communicating with the hollow interior of the tube.

Next, in the prior art for rod and reel cases, in U.S. Pat. No. 5,319,874 to Vance discloses that the invention is a soft sided carrying case for fishing poles, wherein the case has a handle made out of polypropylene webbing and a zipper for opening and closing, the case on the inside has straps or tie downs for holding the fishing poles in place. These straps or tie downs in Vance are fastened permanently on one end and on the other end have a releasably fastener such as Velcro, buttons or snaps, the fishing poles are placed in the case and the tie downs are ran over the fishing poles and are fastened down by the releasable fastener. Further, in Vance in the preferred embodiment the inner and outer covering of the case is nylon, wherein foam is placed between the inner and outer covering of the case, to provide stiffness to the case a masonite board is also added to the foam and stuffing between the inner and outer covering on the top and bottom of the case.

Next looking in the prior art at rod and reel protective covers in United States Patent Application No. 2004/0159689 to Wright disclosed is a new and useful device for carrying a plurality of fishing rods without tangling and an adjustable shoulder strap that allows hands-free transporting. In Wright, one of the unique abilities of the present invention is the capacity to store the device when not in use without the difficulties encountered with other like devices, it is, therefore, a principal object in accordance with a preferred embodiment of the present invention to provide a novel device for carrying fishing rods without tangling the accompanying lines. further in Wright, it is another object of the present invention to provide a novel device, which can preferably, but not necessarily, accommodate eight, fully rigged fishing rods.

What is needed is a protective case that accomplishes is two very basic desirable things to maximize the shipping and transport protection given to the rod and reel. The first desirable thing is "structural rigidity", in other words the protective case must be able to handle a point load impact and be able to handle a bending load imposed upon the rod and reel along its longest axis from end to end. Wherein the aforementioned point load impact and bending load are placed upon the exterior of the protective case, wherein the protective case will absorb and stand up to the brunt of this external loading by being its own rigid structure, thus not transmitting these external protective cover loads to the rod and reel itself. The second desirable thing for the protective case is to have a very snug and close-fitting fit to the exterior surfaces of the rod and reel, that's absolutely minimizes the relative movement of the rod and reel in the protective case during transport or shipment. As this snug fitting concept will go a long way toward preventing the previously described high-frequency occurrence and cumulative damage to either the rod and reel, plus the rod eyelets.

Therefore the challenge of the present invention is to have a protective case apparatus that can custom fit itself to a multitude of different size rod and reels plus to have the structural rigidity necessary to adequately protect the rod and reel, while at the same time having the ability to be used with a number of different sizes and types of vehicles.

SUMMARY OF INVENTION

Broadly, the present invention is of an encasement protective apparatus for enveloping an article, the article having a lengthwise axis, the apparatus including a substantially rigid surrounding sidewall about a longitudinal axis, wherein the surrounding sidewall has a first end portion and an opposing second end portion wherein the longitudinal axis spanning therebetween, the surrounding sidewall also having an outer surface portion and an opposing inner surface portion, thereby the inner surface portion defining a primary interior.

Further included on the encasement protective apparatus is a chamber having a longwise axis, the chamber disposed within the primary interior, the chamber having an exterior surface portion and an opposing interior surface portion, wherein the chamber longwise axis is positioned to be substantially parallel to the longitudinal axis with the chamber disposed substantially from the first end portion to the second end portion, wherein the chamber interior surface portion defines a chamber interior. Also a flexible partition member disposed between the inner surface portion and the exterior surface portion, wherein operationally the flexible partition member dampens relative movement as between the rigid sidewall and said chamber.

Also included on the encasement protective apparatus is a flexible collar that is slidably engaged to a portion of the chamber interior in contact with the interior surface portion along the longitudinal axis, wherein the flexible collar has a collar aperture that removably encompasses a portion of the article, wherein operationally the collar suspends the article within the chamber interior. Further included is a head element having an outermost surface and an opposing innermost surface wherein the head element is affixed to the second end portion such that structurally the outer surface portion extends to the outmost surface and the inner surface portion extends to the innermost surface wherein the flexible partition member extends to be adjacent to the innermost surface, wherein operationally the head element helps to retain the article along the longitudinal axis.

Continuing, on the encasement protective apparatus included is a hatch for removable engagement to the first end portion, wherein the hatch is positioned opposite of the head element in relation to the surrounding sidewall, the hatch having a parsed portion of the flexible partition member that faces the flexible partition member, wherein operationally the hatch further helps to retain the article along the longitudinal axis.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 5 is view 5-5 from FIG. 2, wherein FIG. 5 shows the first end portion of the rigid surrounding sidewall with the door in the open state showing a pivotal hinge of the door and a keyed planar latch that can secure the door to the first end portion of the rigid surrounding sidewall, wherein a plurality of tubular sections are shown as being disposed within a primary interior of the rigid surrounding sidewall;

FIG. 6 is cross section 6-6 from FIG. 1, wherein FIG. 6 shows the second end portion of the rigid surrounding sidewall and in particular the primary interior with the plurality of tubular sections shown as being disposed within the primary interior of the rigid surrounding sidewall, further shown are a plurality of flexible collars slidably engaged to the tubular section interior surface portion, also shown is the flexible fill material and a typical dampening of the flexible fill material, also the mounting angle beam affixed to the rigid surrounding sidewall;

FIG. 7 is cross section 7-7 from FIG. 6, wherein FIG. 7 shows the second end portion of the rigid surrounding sidewall with a head element, and in particular the primary interior with the tubular section shown as being disposed within the primary interior of the rigid surrounding sidewall, further shown are a plurality of flexible collars slidably engaged to the tubular section interior surface portion, wherein the flexible collars support the rod in-between eyelets along the longwise axis of the tubular section, also shown is the flexible fill material and a typical dampening of the flexible fill material;

FIG. 12 is cross section 12-12 from FIG. 13, wherein FIG. 12 shows the second end portion of the rigid surrounding sidewall with a head element, and in particular the primary interior with the tubular section shown as being disposed within the primary interior of the rigid surrounding sidewall, also shown is a nested chamber supported by adhesive foam disposed within the tubular section, further shown are a plurality of flexible collars slidably engaged to a nested chamber interior, wherein the flexible collars support the rod in-between eyelets along the longwise axis of the tubular section, also shown is the flexible fill material and a typical dampening of the flexible fill material; and FIG. 13 is cross section 13-13 from FIG. 12, wherein FIG. 13 shows the second end portion of the rigid surrounding sidewall and in particular the primary interior with the plurality of tubular sections shown as being disposed within the primary interior of the rigid surrounding sidewall, also shown is the nested chamber supported by the adhesive foam disposed within the tubular section, further shown are a plurality of flexible collars slidably engaged to the nested chamber interior, further shown are the plurality of flexible collars slidably engaged to the nested chamber interior, also shown is the flexible fill material and the typical dampening of the flexible fill material, also the mounting angle beam affixed to the rigid surrounding sidewall.

REFERENCE NUMBERS IN DRAWINGS

Figure 1:
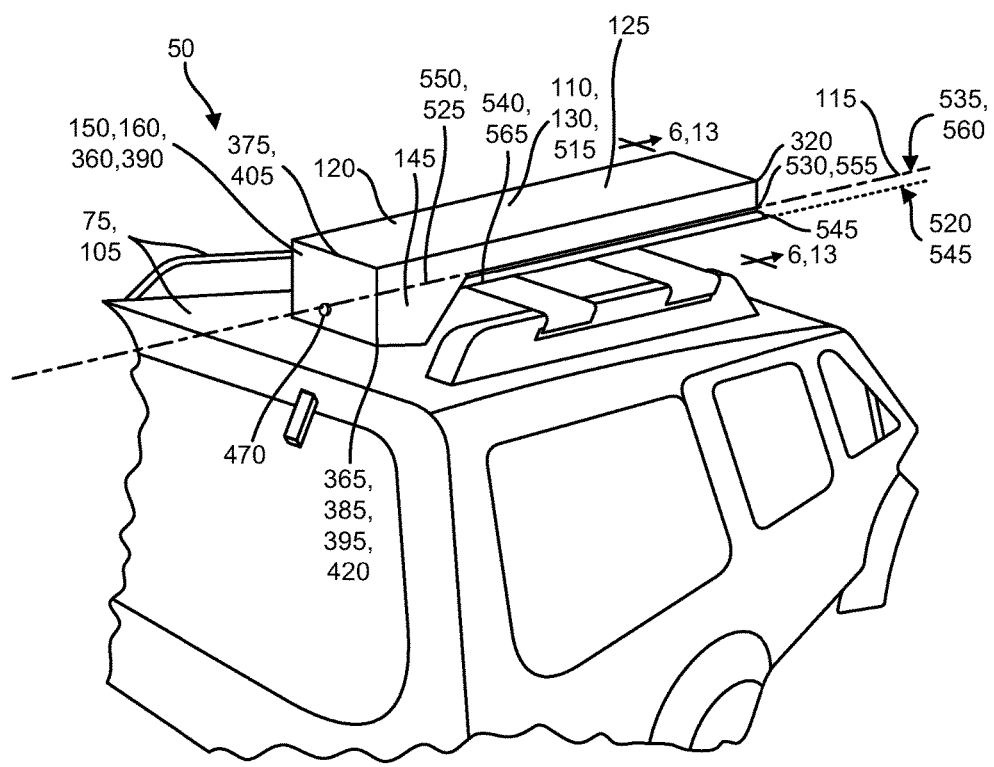
FIG. 1 shows an upper perspective view of the encasement protective apparatus in use installed on a vehicle roof showing the rigid surrounding sidewall with a head element and opposing door, further the rigid surrounding sidewall is removably engagable to the vehicle roof via a mounting angle beam affixed to the rigid sidewall and adapted to removably attach to the vehicle roof.

50 Encasement protective apparatus
55 Article
60 Larger portion of the article 55
65 Plurality of articles 55
70 Lengthwise axis of the article 55
75 Substantially planar surface
80 Fishing rod
81 Eyelet for rod 80 as a line guide
85 Fishing reel
90 Larger portion of the reel 85
95 Plurality of rod 80 and reel 85 assemblies
100 Lengthwise axis of the rod and reel assembly
105 Vehicle roof
110 Substantially rigid surrounding sidewall
115 Longitudinal axis of the sidewall 110
120 First end portion of the sidewall 110
125 Second end portion of the sidewall 110
130 Outer surface portion of the sidewall 110
135 Inner surface portion of the sidewall 110
140 Primary interior of the sidewall 110
145 First end portion 120 larger than the second end portion 125
150 Sizing and configuring of the hatch 360, flexible partition member 260, and parsed portion 370 of the flexible partition member 260 for the larger 145 first end portion 120
155 Accommodating a larger portion 60 of the article 55
160 Sizing and configuring of the door 390, flexible fill material 270, and parsed portion 400 of the flexible fill material 270 for the larger first end portion 90
165 Accommodating a larger portion 90 of the reel 85 relative to the rod 80
170 Chamber
171 Nested chamber
172 Adhesive foam
173 Dampening void between the nested chamber 171 and the chamber 170
175 Longwise axis of the chamber 170
180 Exterior surface portion of the chamber 170
181 Exterior surface portion of the nested chamber 171
185 Interior surface portion of the chamber 170
186 Interior surface portion of the nested chamber 171
190 Interior of the chamber 170
195 Substantially parallel position of the chamber 170 longwise axis 175 to the sidewall 110 longitudinal axis 115
200 Plurality of chambers 170
205 Parallel position of the longwise axes 175 of the plurality of chambers 170 to the sidewall 110 longitudinal axis 115
210 Accommodating a plurality 65 of articles 55
215 Tubular section
220 Longwise axis of the tubular section 215
225 Exterior surface portion of the tubular section 215
230 Interior surface portion of the tubular section 215
235 Interior of the tubular section 215
240 Substantially parallel position of the tubular section 215 longwise axis 220 to the sidewall 110 longitudinal axis 115
245 Plurality of tubular sections 215
250 Parallel position of the longwise axes 220 of the plurality 245 of tubular sections 215 to the sidewall 110 longitudinal axis 115
255 Accommodating a plurality 95 of rod 80 and reel 85 assemblies
260 Flexible partition member
265 Dampening relative movement between the rigid sidewall 110 and the chamber 170
266 Dampening relative movement between the rigid sidewall 110 and the chamber 170 plus between the rigid sidewall 110 and the nested chamber 171
270 Flexible fill material
275 Dampening relative movement between the rigid sidewall 110 and the tubular section 215
276 Dampening relative movement between the rigid sidewall 110 and the tubular section 215 plus between the rigid sidewall 110 and the nested chamber 171
280 Flexible collar
285 Slidable engagement and contact of the flexible collar 280 to the interior surface portion 230, 185
286 Slidable engagement and contact of the flexible collar 280 to the nested interior surface portion 230, 186
290 Aperture of the collar 280
295 Removable encompassing a portion of the article 55 by the collar 280 aperture 290
300 Removable encompassing a portion of the rod 80 by the collar 280 aperture 290
305 Plurality of collars 280
310 Spaced apart manner of the plurality 305 of collars 280 along the longitudinal axis 115
315 Supporting the article 55 or rod 80 at multiple points within the chamber 170 interior 190 or tubular section 215
316 Supporting the article 55 or rod 80 at multiple points within the nested chamber 171 interior 186
320 Head element
325 Outermost surface of the head element 320
330 Innermost surface of the head element 320
335 Affixed nature of head element 320 to the second end portion 125
340 Outer surface portion 130 extends to the outermost surface 325
345 Inner surface portion 135 extends to the innermost surface 330
350 Flexible partition member 260 extends to be adjacent to the innermost surface 330
355 Flexible fill material 270 extends to be adjacent to the innermost surface 330
360 Hatch
365 Removable engagement of the hatch 360 to the first end portion 120
370 Parsed portion of the flexible partition member 260 adjacent to the hatch 360
375 Pivotal hinge of the hatch 360
380 Affixed nature of the pivotal hinge 375 to a portion of the first end portion 120
385 Means for removable engagement between the hatch 360 and the first end portion 120
390 Door 395 Removable engagement of the door 390 to the first end portion 120
400 Parsed portion of the flexible fill material 270 adjacent to the door 390
405 Pivotal hinge of the door 390
410 Affixed nature of the pivotal hinge 405 to a portion of the first end portion 120
420 Means for removable engagement between the door 390 and the first end portion 120
425 Rotating planar latch of the means 385
430 Angle
431 Channel
432 Fastener
435 Affixed nature of the angle 430 to the first end portion 120
436 Affixed nature of the channel 431 via a fastener 432 to the first end portion 120
440 Removable engagement of the latch 425 to the angle 430
441 Removable engagement of the latch 425 to the channel 431
445 Locked state of the latch 425 to the angle 430 thus locking the hatch 360 to the first end portion 120
450 Selectively rotating the latch 425
455 Unlocked state of the latch 425 via selectively rotating 450 the latch 425
460 Angled lip of the latch 425
465 Covering the angle 430 and the latch 425 in the locked state 445 by the angled lip 460
466 Covering the channel 431 and the latch 425 in the locked state 445 by the angled lip 460
470 Keyed rotating planar latch of the means 420
475 Angle beam
480 Affixed nature of the angle beam 475 to the first end portion 120
485 Removable engagement of the latch 470 to the angle beam 475
490 Locked state of the latch 470 to the angle beam 475 thus locking the door 390 to the first end portion 120
491 Locked state of the latch 470 to the channel 431 thus locking the door 390 to the first end portion 120
495 Selectively rotating the latch 470
500 Unlocked state of the latch 470 via selectively rotating 495 the latch 470
505 Angled lip beam of the latch 470
510 Covering the angle beam 475 and the latch 470 in the locked state 490 by the angled lip beam 505
511 Covering the channel 431 and the latch 470 in the locked state 491 by the angled lip beam 505
515 Substantially rectangular prism shape of the sidewall 110
520 Mounting beam
525 Extension axis of the mounting beam 520
530 Affixed nature of the mounting beam 520 to the outer surface portion 130
535 Parallel position of the beam extension axis 525 to the longitudinal axis 115
540 Adaption of the beam 520 to affix to the substantially planar surface 75
545 Mounting angle beam
550 Extension axis of the mounting angle beam 545
555 Affixed nature of the mounting angle beam 545 to the outer surface portion 130
560 Parallel position of the angle beam extension axis 550 to the longitudinal axis 115
565 Adaption of the angle beam 545 to affix to the vehicle roof 105

DETAILED DESCRIPTION

With initial reference to FIG. 1 shown is an upper perspective view of the encasement protective apparatus 50 in use installed on a vehicle roof 105 showing the rigid surrounding sidewall 110 with a head element 320 and opposing door 390, further the rigid surrounding sidewall 110 is removably engaged to the vehicle roof 105 via a mounting angle beam 545 affixed 555 to the rigid surrounding sidewall 110 and adapted 565 to removably attach to the vehicle roof 105.

Figure 2:
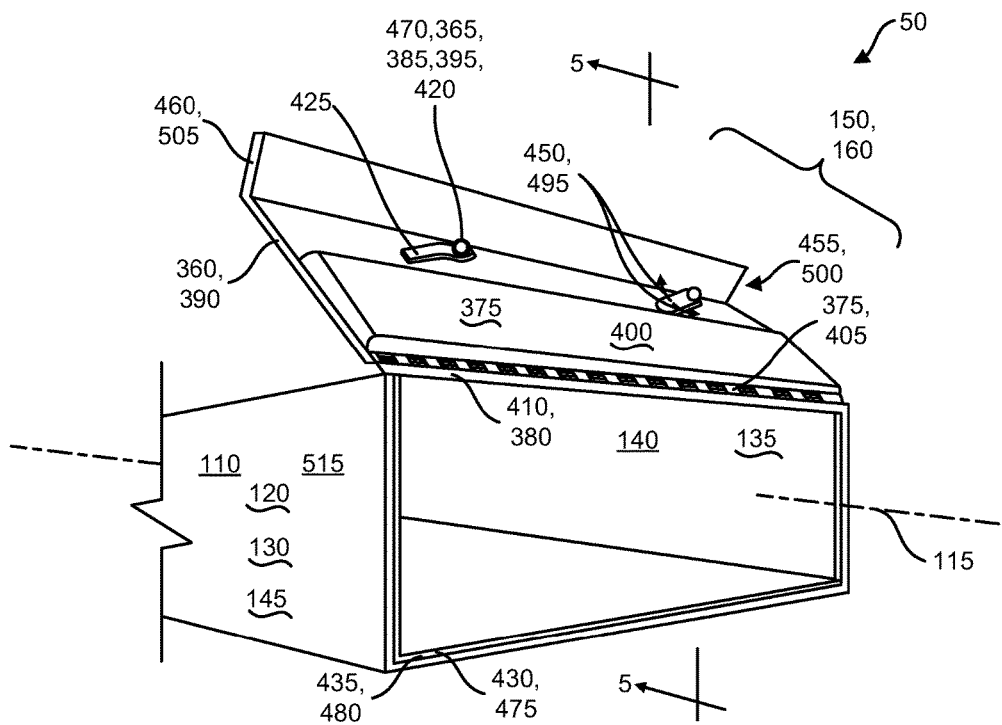
FIG. 2 shows a perspective end view of the first end portion of the rigid surrounding sidewall with the door in the open state showing a pivotal hinge of the door and a keyed planar latch that can secure the door to the first end portion of the rigid surrounding sidewall.

Next to FIG. 2 shown is a perspective end view of the first end portion 120 of the rigid surrounding sidewall 110 with the door 390 in the open state 500 showing a pivotal hinge 405 of the door 390 and a keyed planar latch 470 that can secure 490 the door 390 to the first end portion 120 of the rigid surrounding sidewall 110.

Figure 3:
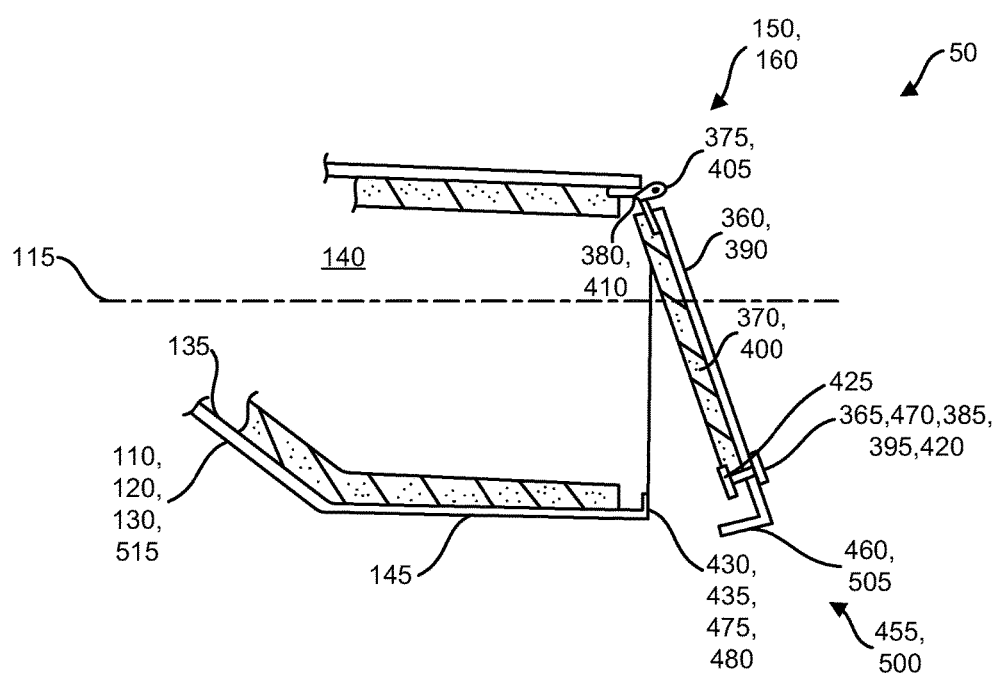
FIG. 3 is a side elevation cross section of the first end portion of the rigid surrounding sidewall with the door in the open state showing a pivotal hinge of the door and a keyed planar latch that can secure the door to the first end portion of the rigid surrounding sidewall, further shown is an angled lip, angle beam, and flexible fill material lining for the door and the rigid surrounding sidewall.

Continuing to FIG. 3 is a side elevation cross section of the first end portion 120 of the rigid surrounding sidewall 110 with the door 390 in the open state 500 showing the pivotal hinge 405 of the door 390 and the keyed planar latch 470 that can secure the door 390 to the first end portion 120 of the rigid surrounding sidewall 110, further shown is an angled lip 460, angle beam 475, and flexible fill 270 material lining the door 390 and the rigid surrounding sidewall 110.

Figure 4:
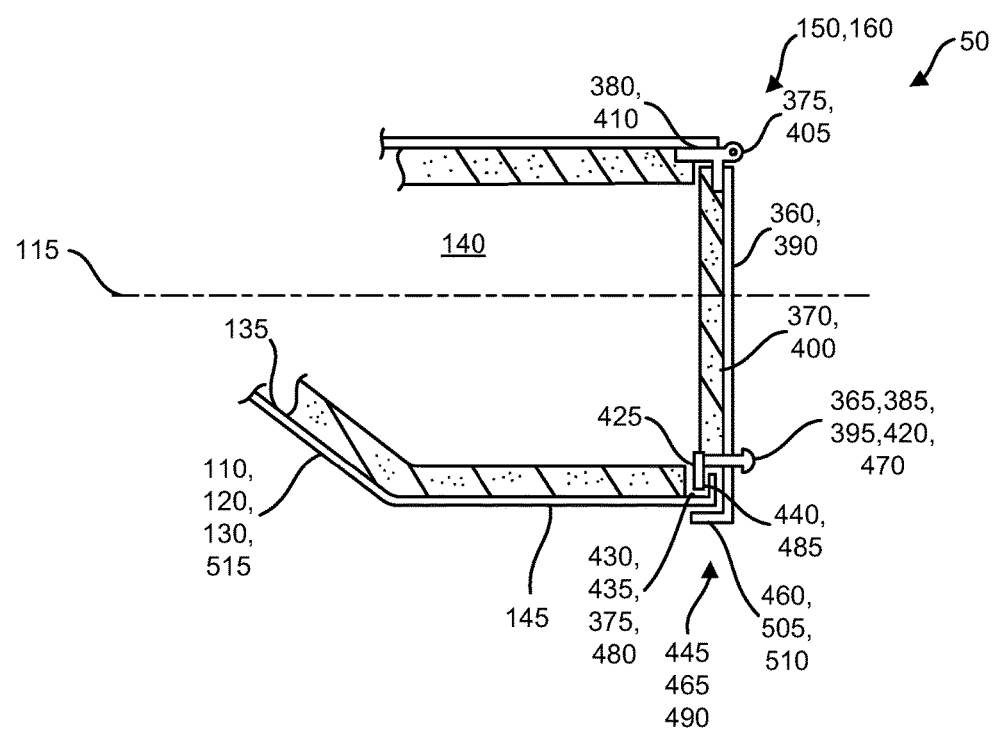
FIG. 4 is a side elevation cross section of the first end portion of the rigid surrounding sidewall with the door in the closed state showing a pivotal hinge of the door and a keyed planar latch that secures the door to the first end portion of the rigid surrounding sidewall, further shown is an angled lip, angle beam, and flexible fill material lining the door and the rigid surrounding sidewall, wherein the angle beam and latch are covered by the angled lip for increased security of the door in the closed state.

Further, FIG. 4 is a side elevation cross section of the first end portion 120 of the rigid surrounding sidewall 110 with the door 390 in the closed state 490 showing the pivotal hinge 405 of the door 390 and the keyed planar latch 470 that secures the door 390 to the first end portion 120 of the rigid surrounding sidewall 110, further shown is the angled lip 460, angle beam 475, and flexible fill material 270 lining the door 390, and the rigid surrounding sidewall 110, wherein the angle beam 475 and latch 470 are covered 510 by the angled lip 505 for increased security of the door 390 in the closed state 490.

Figure 5:
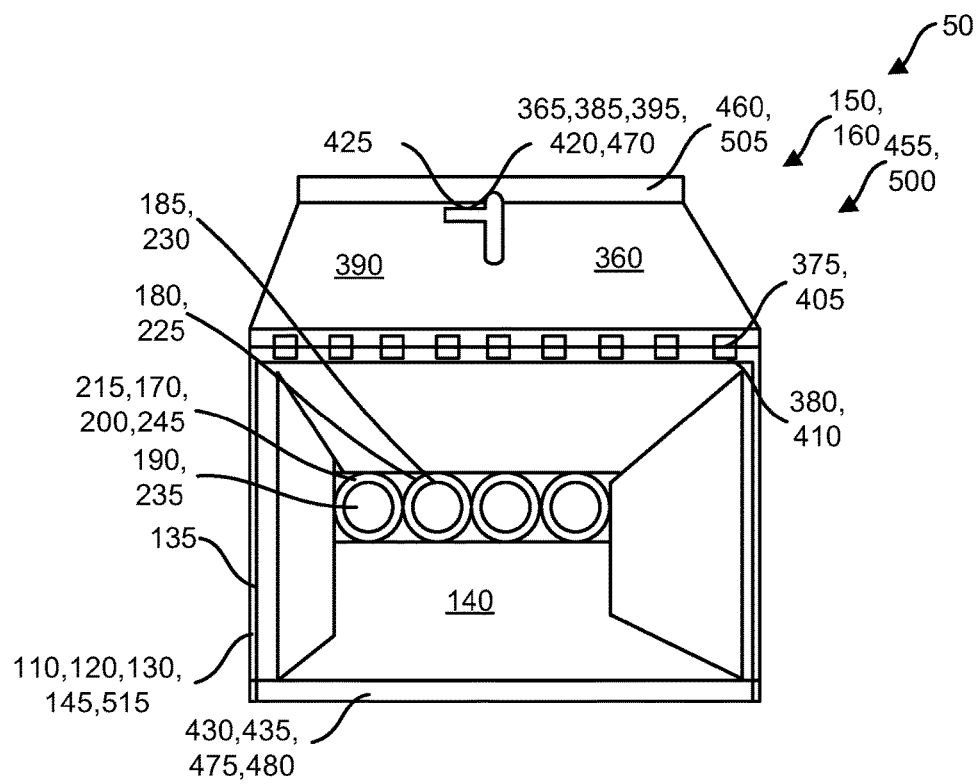

Moving onward, FIG. 5 is view 5-5 from FIG. 2, wherein FIG. 5 shows the first end portion 120 of the rigid surrounding sidewall 110 with the door 390 in the open state 500 showing the pivotal hinge 405 of the door 390 and the keyed planar latch 470 that can secure the door 390 to the first end portion 120 of the rigid surrounding sidewall 110, wherein a plurality 245 of tubular sections 215 are shown as being disposed within a primary interior 140 of the rigid surrounding sidewall 110.

Figure 6:
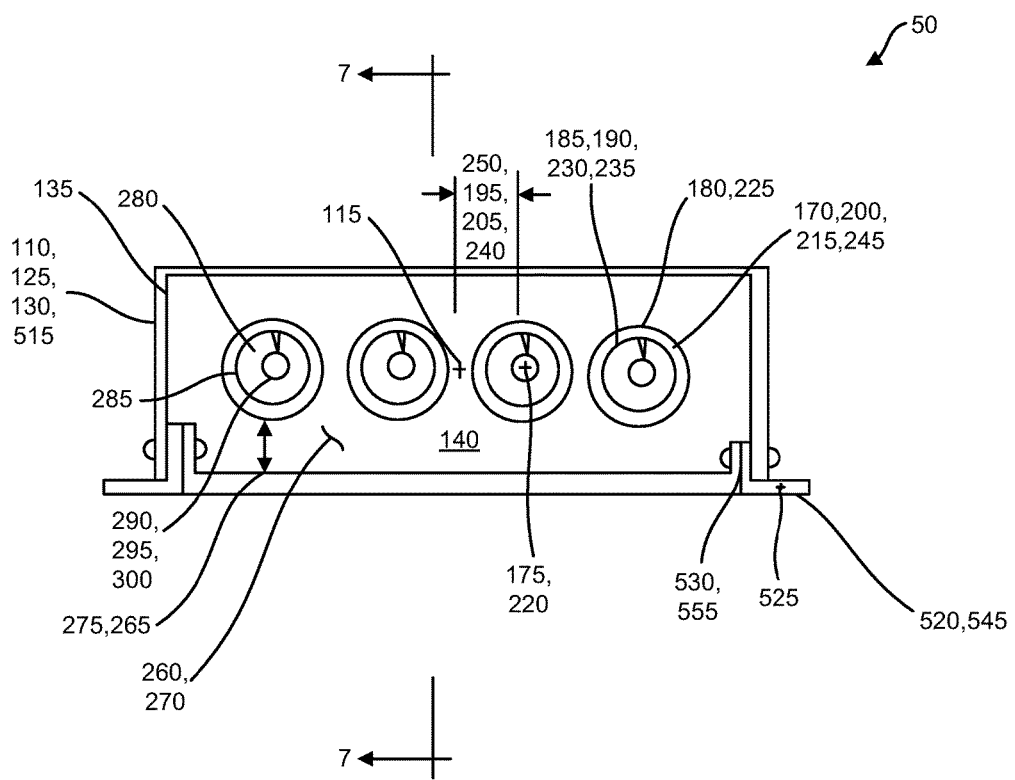

Next, FIG. 6 is cross section 6-6 from FIG. 1, wherein FIG. 6 shows the second end portion 125 of the rigid surrounding sidewall 110 and in particular the primary interior 140 with the plurality 245 of tubular sections 215 shown as being disposed within the primary interior 140 of the rigid surrounding sidewall 110, further shown are a plurality 305 of flexible collars 280 slidably engaged 285 to the tubular section 215 interior surface portion 230, also shown is the flexible fill material 270 and a typical dampening 275 of the flexible fill material 270, also the mounting angle beam 545 that is affixed 555 to the rigid surrounding sidewall 110 outer surface portion 130.

Figure 7:
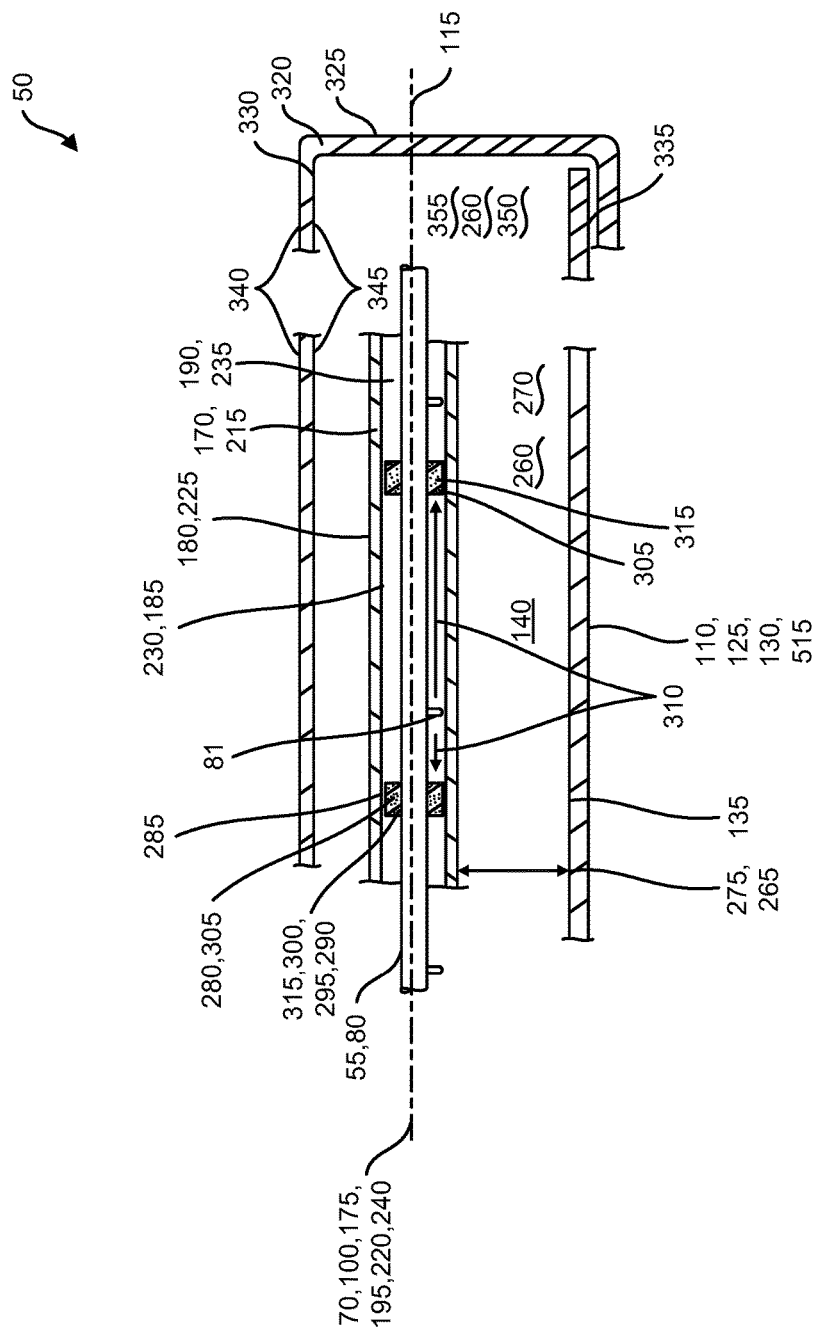

Moving onward, FIG. 7 is cross section 7-7 from FIG. 6, wherein FIG. 7 shows the second end portion 125 of the rigid surrounding sidewall 110 with a head element 320, and in particular the primary interior 140 with the tubular section 215 shown as being disposed within the primary interior 140 of the rigid surrounding sidewall 110, further shown are a plurality 305 of flexible collars 280 slidably engaged 285 to the tubular section 215 interior surface portion 230, wherein the flexible collars 280 support the rod 80 in-between eyelets 81 along the longwise axis 220 of the tubular section 215, also shown is the flexible fill material 270 and a typical dampening 275 of the flexible fill material 270.

Figure 8:
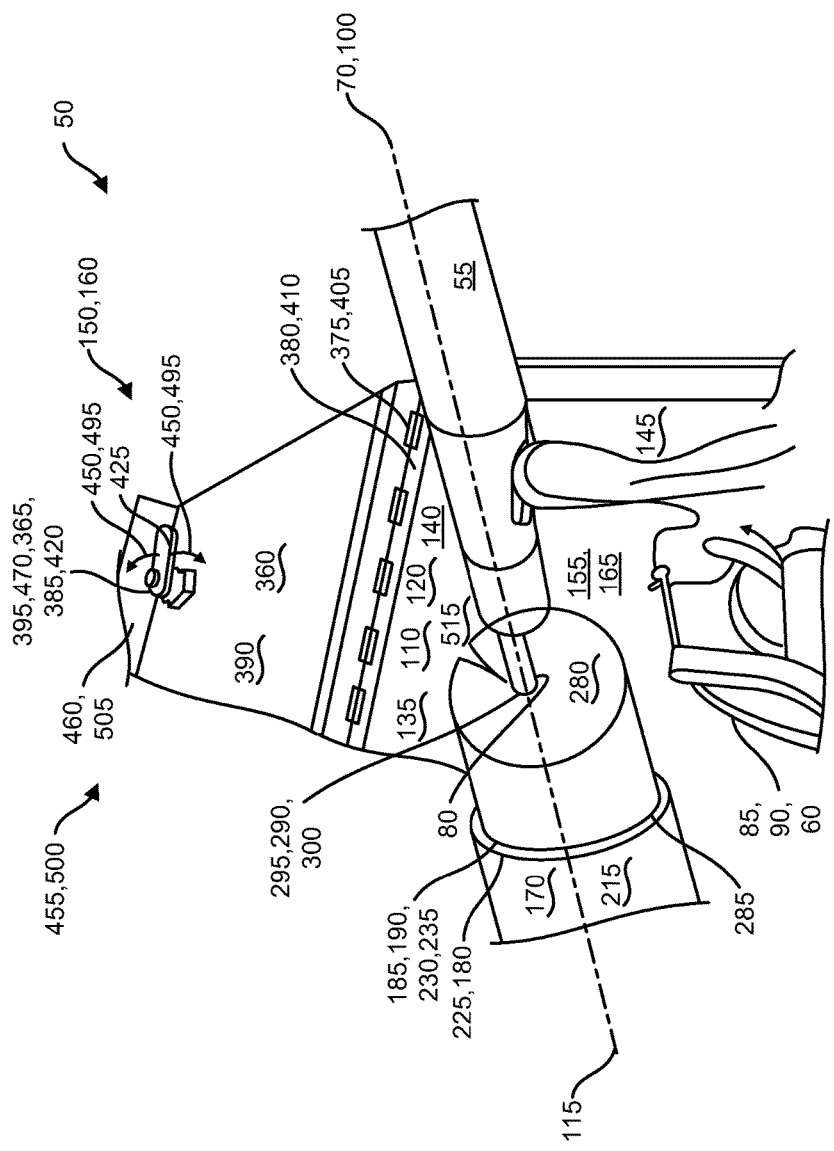
FIG. 8 shows the encasement protective apparatus in use with a perspective end view of the first end portion of the rigid surrounding sidewall with the door in the open state showing a pivotal hinge of the door and a keyed planar latch that can secure the door to the first end portion of the rigid surrounding sidewall, further the article in the form of a rod and reel is inserted into the tubular section with the flexible collar shown to be supporting the rod.

Next, FIG. 8 shows the encasement protective apparatus 50 in use with a perspective end view of the first end portion 120 of the rigid surrounding sidewall 110 with the door 390 in the open state 500 showing the pivotal hinge 405 of the door 390 and a keyed planar latch 470 that can secure 490 the door 390 to the first end portion 120 of the rigid surrounding sidewall 110, further the article 55 in the form of the rod 80 and reel 85 is inserted into the tubular section 215 with the flexible collar 280 shown to be supporting the rod 80.

Figure 9:
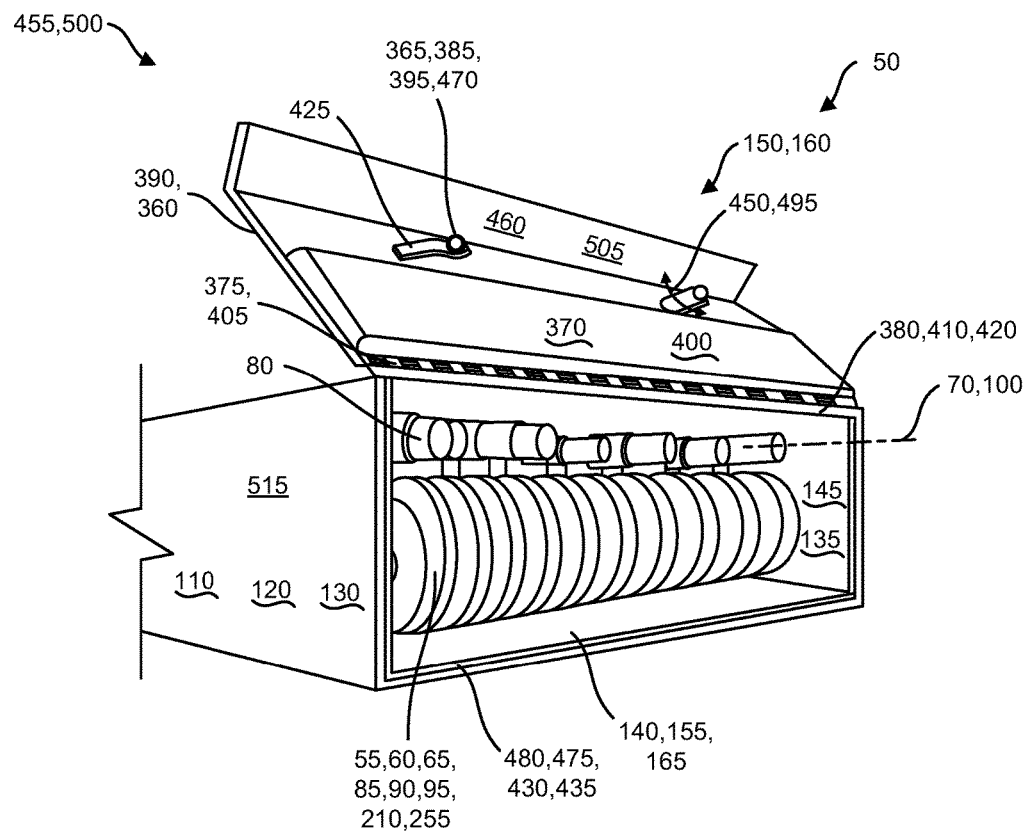
FIG. 9 shows the encasement protective apparatus in use with a perspective end view of the first end portion of the rigid surrounding sidewall with the door in the open state showing a pivotal hinge of the door and a keyed planar latch that can secure the door to the first end portion of the rigid surrounding sidewall, further the articles in the form of a plurality of rod and reel assemblies that are inserted into the tubular section with the flexible collar shown to be supporting the rod (tubular section and flexible collar not shown in this view)

Continuing, FIG. 9 shows the encasement protective apparatus 50 in use with a perspective end view of the first end portion 120 of the rigid surrounding sidewall 110 with the door 390 in the open state 500 showing a pivotal hinge 405 of the door 390 and a keyed planar latch 470 that can secure the door 390 to the first end portion 120 of the rigid surrounding sidewall 110, further the plurality 65 articles 55 in the form of a plurality 95 of rod 80 and reel 85 assemblies that are inserted into the plurality 245 of tubular sections 215 with the plurality 305 of flexible collars 280 that support the rods 85 (tubular sections 215 and flexible collars 280 not shown in this view).

Figure 10:
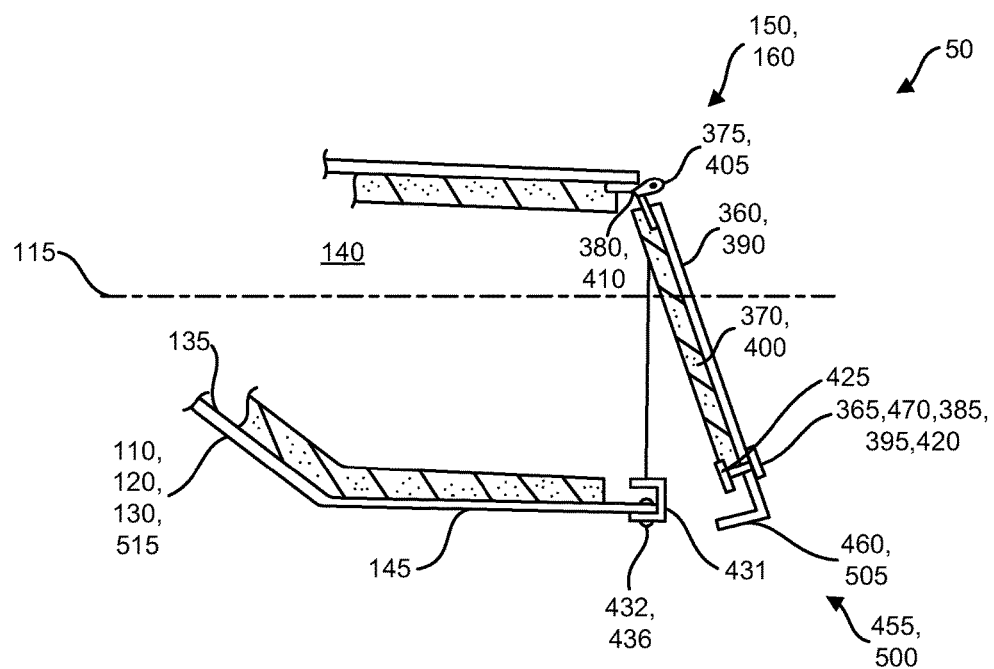
FIG. 10 is a side elevation cross section of the first end portion of the rigid surrounding sidewall with the door in the open state showing a pivotal hinge of the door and a keyed planar latch that can secure the door to the first end portion of the rigid surrounding sidewall, further shown is a channel, and flexible fill material lining for the door and the rigid surrounding sidewall.

Further, FIG. 10 is a side elevation cross section of the first end portion 120 of the rigid surrounding sidewall 110 with the door 390 in the open state 500 showing a pivotal hinge 405 of the door 390 and a keyed planar latch 470 that can secure the door 390 to the first end portion 120 of the rigid surrounding sidewall 110, further shown is a channel 431, and flexible fill material 270 lining for the door 390 and the rigid surrounding sidewall 110.

Figure 11:
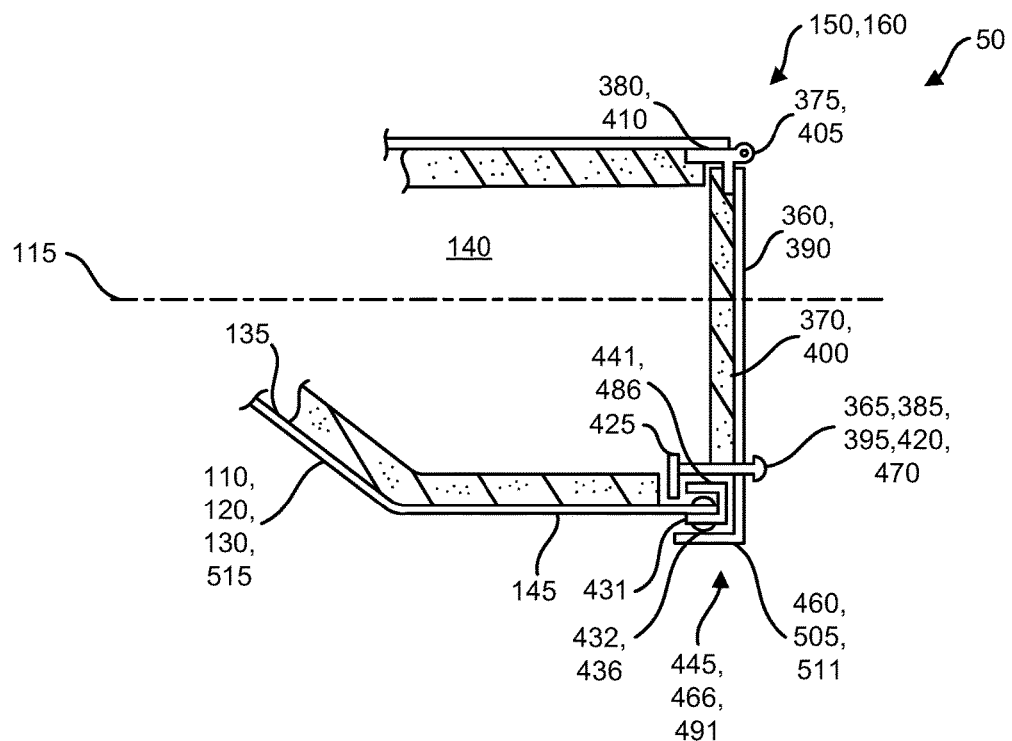
FIG. 11 is a side elevation cross section of the first end portion of the rigid surrounding sidewall with the door in the closed state showing a pivotal hinge of the door and a keyed planar latch that secures the door to the first end portion of the rigid surrounding sidewall, further shown is the channel and flexible fill material lining the door and the rigid surrounding sidewall, wherein the channel and latch are covered by the angled lip for increased security of the door in the closed state.

Next, FIG. 11 is a side elevation cross section of the first end portion 120 of the rigid surrounding sidewall 110 with the door 390 in the closed state 490 showing a pivotal hinge 405 of the door 390 and a keyed planar latch 470 that secures the door 390 to the first end portion 120 of the rigid surrounding sidewall 110, further shown is the channel 431 and flexible fill material 270 lining the door 390 and the rigid surrounding sidewall 110, wherein the channel 431 and latch 470 are covered by the angled lip 505 for increased security of the door 390 in the closed state 490.

Figure 12:
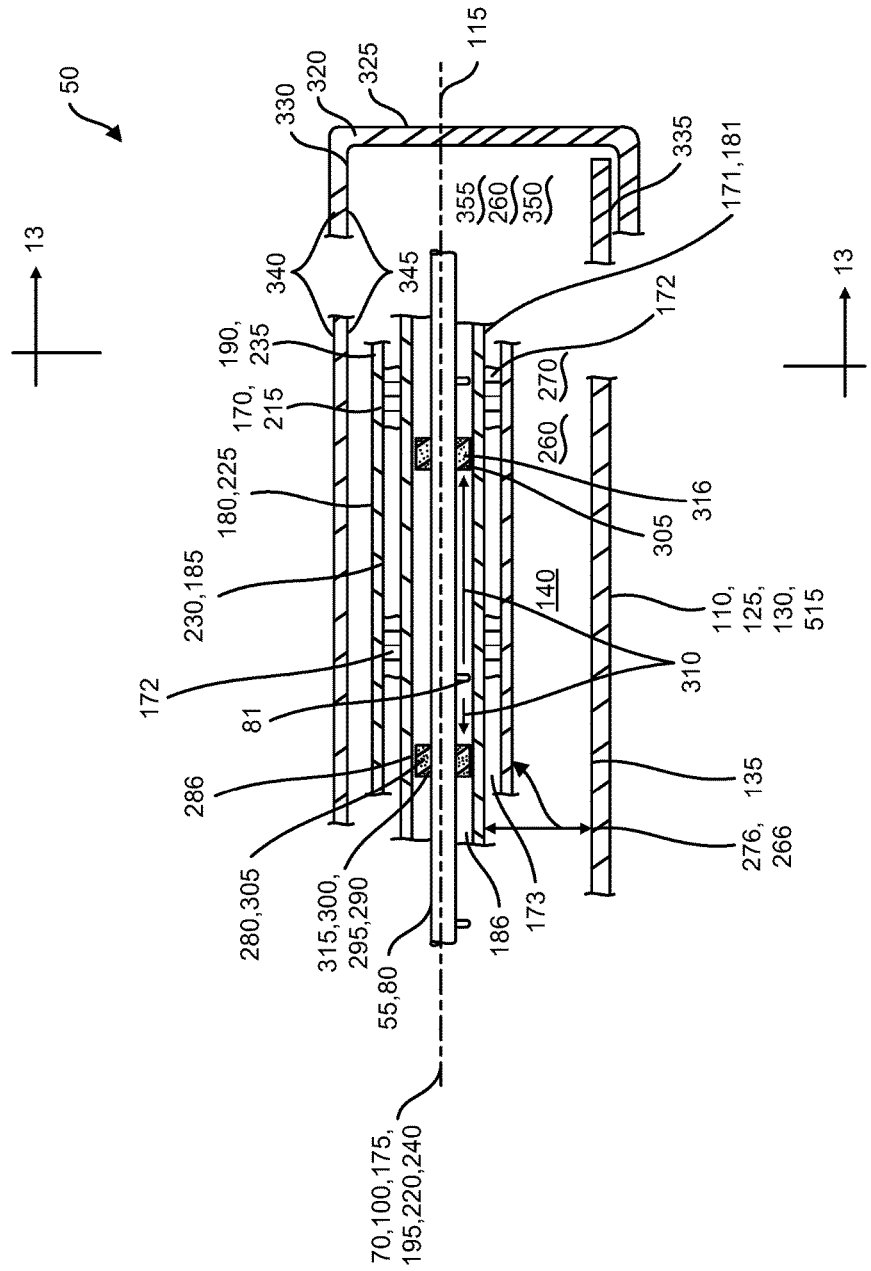
Figure 13:
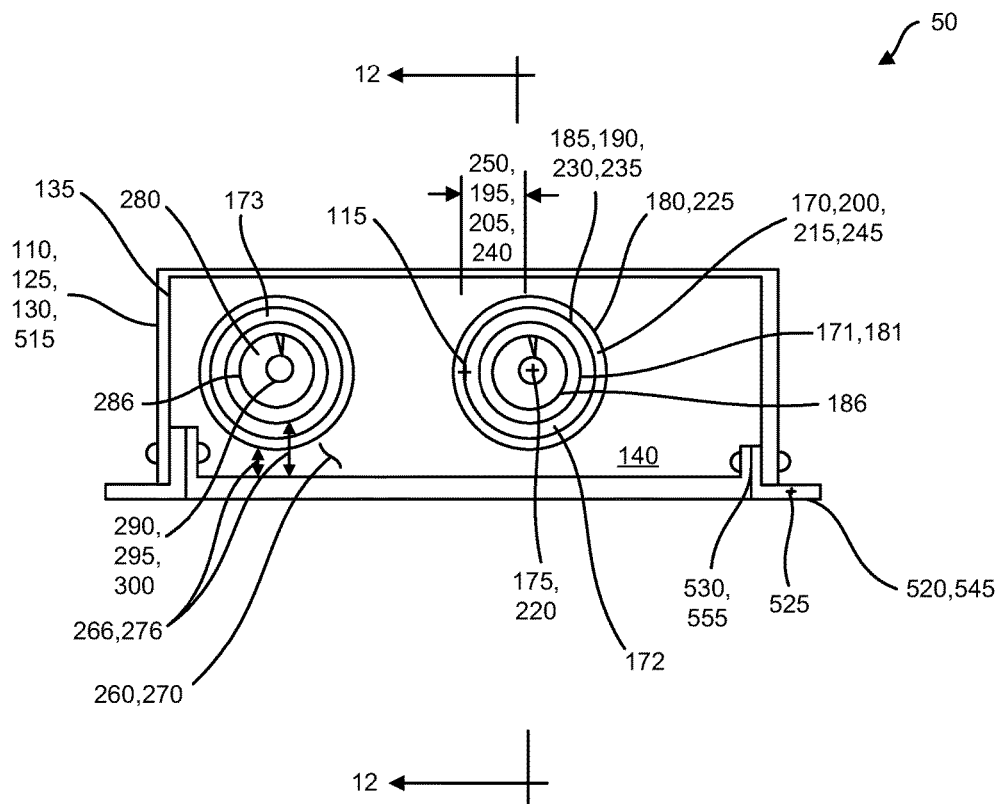

Continuing, FIG. 12 is cross section 12-12 from FIG. 13, wherein FIG. 12 shows the second end portion 125 of the rigid surrounding sidewall 110 with a head element 320, and in particular the primary interior 140 with the tubular section 215 shown as being disposed within the primary interior 140 of the rigid surrounding sidewall 110, also shown is a nested chamber 171 supported by adhesive foam 172 disposed within the tubular section 215, further shown are a plurality of flexible collars 280 slidably engaged to a nested chamber interior 186, wherein the flexible collars 280 support the rod 80 in-between eyelets 81 along the longwise axis 220 of the tubular section 215, also shown is the flexible fill material 270 and a typical dampening 266, 276 of the flexible fill material 270.

Further, FIG. 13 is cross section 13-13 from FIG. 12, wherein FIG. 13 shows the second end portion 125 of the rigid surrounding sidewall 110 and in particular the primary interior 140 with the plurality 245 of tubular sections 215 shown as being disposed within the primary interior 140 of the rigid surrounding sidewall 110, also shown is the nested chamber 171 supported by the adhesive foam 172 disposed within the tubular section 215, further shown are a plurality 305 of flexible collars 280 slidably engaged 285 to the nested chamber interior 186, further shown are the plurality 305 of flexible collars 280 slidably engaged to the nested chamber interior 186, also shown is the flexible fill material 270 and the typical dampening 266, 276 of the flexible fill material 270, also the mounting angle beam 545 affixed to the rigid surrounding sidewall 110.

Broadly, the present invention is of an encasement protective apparatus 50 for enveloping an article 55, the article 55 having a lengthwise axis 70, the apparatus 50 including a substantially rigid surrounding sidewall 110 about a longitudinal axis 115, wherein the surrounding sidewall 110 has a first end portion 120 and an opposing second end portion 125 wherein the longitudinal axis 115 spanning therebetween, the surrounding sidewall 110 also having an outer surface 130 portion and an opposing inner surface portion 135, thereby the inner surface portion 135 defining a primary interior 140, as best shown in FIGS. 2 to 9.

Further included on the encasement protective apparatus 50 is a chamber 170 having a longwise axis 175, the chamber 170 disposed within the primary interior 140, the chamber 170 having an exterior surface portion 180 and an opposing interior surface portion 185, wherein the chamber 170 longwise axis 175 is positioned to be substantially parallel 195 to the longitudinal axis 115 with the chamber 170 disposed substantially from the first end portion 120 to the second end portion 125, wherein the chamber 170 interior surface portion 185 defines a chamber interior 190, as best shown in FIGS. 5 to 8. Also a flexible partition member 260 disposed between the inner surface portion 135 and the exterior surface portion 180, wherein operationally the flexible partition member 260 dampens relative movement 265 as between the rigid sidewall 110 and the chamber 170, see again see FIGS. 5 to 8.

Also included on the encasement protective apparatus 50 is a flexible collar 280 that is slidably engaged 285 to a portion of the chamber 170 interior 190 in contact with the interior 190 surface portion 185, 230 along the longitudinal axis 115, wherein the flexible collar 280 has a collar 280 aperture 290 that removably encompasses 295 a portion of the article 55, wherein operationally the collar 280 suspends or supports 315 the article 55 within the chamber 170 interior 190, as best shown in FIGS. 6, 7, and 8. Further included is a head element 320 having an outermost surface 325 and an opposing innermost surface 330 wherein the head element 320 is affixed 335 to the second end portion 125 such that structurally the outer surface portion 130 extends 340 to the outmost surface 325 and the inner surface portion 135 extends 345 to the innermost surface 330 wherein the flexible partition member 260 extends 350 to be adjacent to the innermost surface 330, wherein operationally the head element 320 helps to retain the article 55 along the longitudinal axis 115, as best shown in FIG. 7, plus see FIG. 1.

Continuing, on the encasement protective apparatus 50 included is a hatch 360 for removable engagement 365 to the first end portion 120, wherein the hatch 360 is positioned opposite of the head element 320 in relation to the surrounding sidewall 110, the hatch 360 having a parsed portion 370 of the flexible partition member 260 that faces the flexible partition member 260, wherein operationally the hatch 360 further helps to retain the article 55 along the longitudinal axis 115, see in particular FIGS. 2 to 5, plus FIGS. 1, 8, and 9.

Optionally for the encasement protective apparatus 50 the surrounding sidewall 110 can generally form a substantially rectangular prism shape 515, to further ease mounting on a substantially planar surface 75 of the encasement protective apparatus 50, see in particular FIG. 1, in addition to FIGS. 2, 5, 6, 8, and 9.

Further, optionally for the encasement protective apparatus 50 the sidewall 110 further comprises a mounting beam 520 having an extension axis 525, with the mounting beam affixed 530 to the outer surface portion 130 of the surrounding sidewall 110 wherein the beam 520 extension axis 525 is positioned substantially parallel 535 to the longitudinal axis 115, wherein operationally the beam 520 is adapted 540 to affix to a substantially planar surface 75, thus affixing the encasement protective apparatus 50 to the substantially planar surface 75, as best shown in FIG. 1, also see FIG. 6.

Continuing optionally, for the encasement protective apparatus 50 wherein the hatch 360 further comprises a pivotal hinge 375 affixed 380 to a portion of the first end portion 120 in combination with a means 385 for removable engagement as between the hatch 360 and the first end portion 120, see FIGS. 2 to 5, plus FIGS. 1, 8, and 9.

Another alternative for the encasement protective apparatus 50 wherein the means 385 for removable engagement is preferably constructed of a rotating planar latch 425 that removably engages 440 an angle 430 affixed 435 to the first end portion 120 to be placed in a locked state 445 and selectably rotating 450 the latch 425 disengages from the angle 430 and places the latch 425 into an unlocked state 455, see FIGS. 3 and 4 in particular, plus FIGS. 1, 2, 5, 8, and 9.

A further alternative for the encasement protective apparatus 50 is wherein the hatch 360 can further comprise an angled lip 460 that covers the angle 430 and the latch 425 when the latch 425 is in the locked state 445, which in effect hides or covers 465 the angle 430 and the latch 425 from an external environment to help increase security of the locked state 445, again see FIGS. 3 and 4 in particular, plus FIGS. 1, 2, 5, 8, and 9.

Continuing on alternatives for the encasement protective apparatus 50 can further comprise a plurality 305 of the flexible collars 280 that are disposed is a spaced apart manner 310 along the longitudinal axis 115 to operationally support the article 55 at multiple points 315 within the chamber 170, see FIG. 7 in particular.

Next on alternatives for the encasement protective apparatus 50 can further comprise a plurality 200 of the chambers 170 that are positioned substantially parallel 205 via the longwise axis 175 to one another within the primary interior 140 to operationally accommodate 210 a plurality 65 of articles 55, see in particular FIGS. 5 and 6.

Also on alternatives for the encasement protective apparatus 50 wherein the first end portion 120 is larger 145 than the second end portion 125, further the hatch 360, the flexible partition member 260, and the parsed portion 370 of the flexible partition member 260 are all sized and configured 150 to match the larger 145 first end portion 120, being operational to accommodate 155 a larger portion 60 of the article 55, see in particular FIGS. 1 to 5, plus FIGS. 8 and 9.

Continuing on the encasement protective apparatus 50 for enveloping a fishing rod 80 and reel 85, the fishing rod 80 and reel 85 having a lengthwise axis 100, the apparatus 50 includes the substantially rigid surrounding sidewall 110 about the longitudinal axis 115, wherein the surrounding sidewall 110 has the first end portion 120 and the opposing second end portion 125 wherein the longitudinal axis 115 spanning therebetween, the surrounding sidewall 110 also having the outer surface portion 130 and the opposing inner surface portion 135, thereby the inner surface portion 135 defining the primary interior 140, as best shown in FIGS. 2 to 9.

Also included in the encasement protective apparatus 50 is a tubular section 215 having a longwise axis 220, the tubular section 215 disposed within the primary interior 140, the tubular section 215 having a tubular section 215 exterior surface portion 225 and an opposing tubular section 215 interior surface portion 230, wherein the tubular section 215 longwise axis 220 is positioned to be substantially parallel 240 to the longitudinal axis 115 with the tubular section 215 disposed substantially from the first end portion 120 to the second end portion 125, wherein the tubular section 215 interior surface portion 230 defines a tubular section interior 235, see FIGS. 5 to 8. Further included is a flexible fill material 270 disposed between the inner surface portion 135 and the tubular section exterior surface portion 225, wherein operationally the flexible fill material 270 dampens relative movement 275 as between the rigid sidewall 110 and the tubular section 215, again see FIGS. 5 to 8.

Continuing, included in the encasement protective apparatus 50 is a flexible collar 280 that is slidably engaged 285 to a portion of the tubular section 215 interior 235 in contact with the tubular section 215 interior surface portion 230 along the longitudinal axis 115, wherein the flexible collar 280 has a collar 280 aperture 290 that removably encompasses 300 a portion of the rod 80, wherein operationally the collar 280 suspends the rod 80 within the tubular section 215 interior 235, see FIGS. 6, 7, and 8.

Yet further included in the encasement protective apparatus 50 is the head element 320 having the outermost surface 325 and the opposing innermost surface 330 wherein the head element 320 is affixed 335 to the second end portion 125 such that structurally the outer surface portion 130 extends to the outmost surface 325 and the inner surface portion 135 extends to the innermost surface 330 wherein the flexible fill material 270 extends 355 to be adjacent to the innermost surface 330, wherein operationally the head element 320 helps to retain the rod 80 and reel 85 along the longitudinal axis 115, as best shown in FIG. 7, plus see FIG. 1.

Moving onward included in the encasement protective apparatus 50 is a door 390 for removable engagement 395 to the first end portion 120, wherein the door 390 is positioned opposite of the head element 320 in relation to the surrounding sidewall 110, the door 390 having a parsed portion 400 of the flexible fill material 270 that faces the flexible fill material 270, wherein operationally the door 390 further helps to retain the rod 80 and reel 85 along the longitudinal axis 115, see in particular FIGS. 2 to 5, plus FIGS. 1, 8, and 9.

Optionally for the encasement protective apparatus 50 the surrounding sidewall 110 can generally form a substantially rectangular prism shape 515, to further ease mounting on a vehicle roof 105 of the encasement protective apparatus 50, see in particular FIG. 1, in addition to FIGS. 2, 5, 6, 8, and 9.

Again optionally for the encasement protective apparatus 50 wherein the sidewall can further comprise a mounting angle beam 545 with an extension axis 550, the mounting angle beam 545 affixed 555 to the outer surface portion 130 of the surrounding sidewall 110 wherein the angle beam 545 extension axis 550 is positioned substantially parallel 560 to the longitudinal axis 115, wherein operationally the beam 545 is adapted 565 to affix to the vehicle roof 105, thus affixing the encasement protective apparatus 50 to the vehicle roof 105, as best shown in FIG. 1, also see FIG. 6.

Another option for the encasement protective apparatus 50 wherein the door 390 further comprises a pivotal hinge 405 affixed 410 to a portion of the first end portion 120 in combination with a means 420 for removable engagement as between the door 390 and the first end portion 120, see FIGS. 2 to 5, plus FIGS. 1, 8, and 9.

Alternatively for the encasement protective apparatus 50 wherein the means 420 for removable engagement 485 is preferably constructed of a keyed rotating planar latch 470 that removably engages an angle beam 475 affixed 480 to a portion of the first end portion 120 to be placed in a locked state 490 and selectably rotating 495 the latch 470 disengages from the angle beam 475 places the latch 470 into an unlocked state 500, see FIGS. 3 and 4 in particular, plus FIGS. 1, 2, 5, 8, and 9.

Another alternative for the encasement protective apparatus 50 wherein the door 390 further comprises an angled lip beam 505 that covers 510 the angle beam 475 and the latch 470 when the latch 470 is in the locked state 490, which in effect hides 510 the angle beam 475 and the latch 470 from an external environment to help increase security of the locked state, again see FIGS. 3 and 4 in particular, plus FIGS. 1, 2, 5, 8, and 9.

Further an alternative for the encasement protective apparatus 50 can further comprise a plurality 305 of the flexible collars 280 that are disposed is a spaced apart manner 310 along the longitudinal axis 115 to operationally support the rod 80 at multiple points 315 within the tubular section 215, see FIG. 7 in particular.

Yet another alternative for the encasement protective apparatus 50 can further comprise a plurality 245 of the tubular sections 215 that are positioned substantially parallel 250 to one another within the primary interior 140 to operationally accommodate 255 a plurality 95 of the rod 80 and reel 85 assemblies, see FIGS. 5 and 6.

Also an alternative encasement protective apparatus 50 wherein the first end portion 120 is larger 145 than the second end portion 125, further the door 390, the flexible fill material 270, and the parsed portion 400 of the flexible fill material 270 are all sized and configured 160 to match the larger first end portion 90, being operational to accommodate 165 a larger portion 90 of the reel portion 85 of the rod 80 and reel 85 assembly, see in particular FIGS. 1 to 5, plus FIGS. 8 and 9.

A further alternative for the encasement protective apparatus 50 can further comprise the adhesive foam 172 that is affixed to a portion of the tubular section 215 interior 230 in contact with the tubular section 215 interior surface 230 portion along the longitudinal axis 115, in conjunction with the nested chamber 171 disposed within the tubular section 215 interior 230 and supported by the adhesive foam 172, see in particular FIGS. 12 and 13. Also included in the alternative for the encasement protective apparatus 50 it can further comprise the flexible collar 280 that is slidably engaged to a portion of an interior 186 of said nested chamber 171 along the longitudinal axis 115, wherein the flexible collar 280 has a collar aperture 290 that removably encompasses 300 a portion of the rod 80, wherein operationally the collar 280 suspends the rod 80 within the nested chamber 171 interior 186, further operationally the flexible collar 280, the adhesive film 172, and the flexible fill material 270 all act together to dampen relative movement 266, 276 as between the rigid sidewall 110 and the rod 80 to reduce possible damage to the rod 80, again see FIGS. 12 and 13.

An added alternative for the encasement protective apparatus 50, wherein the door 390 can further comprises the pivotal hinge 375 affixed 380 to a portion of the first end portion 120 in combination with the keyed rotating planar latch 470 that removably engages a channel 431 affixed 432 to a portion of the first end portion 120 to be placed in a locked state 445 and selectably rotating the latch 470 disengages from the channel 431 and places the latch 470 into an unlocked state 455, the door 390 further comprises an angled lip beam 505 that covers the channel 431 when the latch 470 is in the locked state 445, which in effect hides the channel 431 and the latch 470 from the external environment to help increase security of the locked state 445, see in particular FIGS. 10 and 11.

CONCLUSION

Accordingly, the present invention of an encasement protective apparatus 50 has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. An encasement protective apparatus for enveloping an article, the article having a lengthwise axis, said apparatus comprising:
   (a) a substantially rigid surrounding sidewall about a longitudinal axis, wherein said surrounding sidewall has a first end portion and an opposing second end portion wherein said longitudinal axis spanning therebetween, said surrounding sidewall also having an outer surface portion and an opposing inner surface portion, thereby said inner surface portion defining a primary interior;
   (b) a chamber having a longwise axis, said chamber disposed within said primary interior, said chamber having an exterior surface portion and an opposing interior surface portion, wherein said chamber longwise axis is positioned to be substantially parallel to said longitudinal axis with said chamber disposed substantially from said first end portion to said second end portion, wherein said chamber interior surface portion defines a chamber interior;
   (c) a flexible partition member disposed between said inner surface portion and said exterior surface portion, wherein operationally said flexible partition member dampens relative movement as between said rigid sidewall and said chamber;
   (d) a flexible collar that is slidably engaged to a portion of said chamber interior in contact with said interior surface portion along said longitudinal axis, wherein said flexible collar has a collar aperture that removably encompasses a portion of the article, wherein operationally said collar suspends the article within said chamber interior;
   (e) a head element having an outermost surface and an opposing innermost surface wherein said head element is affixed to said second end portion such that structurally said outer surface portion extends to said outmost surface and said inner surface portion extends to said innermost surface wherein said flexible partition member extends to be adjacent to said innermost surface, wherein operationally said head element helps to retain the article along said longitudinal axis; and
   (f) a hatch for removable engagement to said first end portion, wherein said hatch is positioned opposite of said head element in relation to said surrounding sidewall, said hatch having a parsed portion of said flexible partition member that faces said flexible partition member, wherein operationally said hatch further helps to retain the article along said longitudinal axis.

2. An encasement protective apparatus according to claim 1 wherein said surrounding sidewall generally forms a substantially rectangular prism shape, to further ease mounting on a substantially planar surface of said encasement protective apparatus.

3. An encasement protective apparatus according to claim 2, wherein said sidewall further comprises a mounting beam having an extension axis, said mounting beam affixed to said outer surface portion of said surrounding sidewall wherein said beam extension axis is positioned substantially parallel to said longitudinal axis, wherein operationally said beam is adapted to affix to a substantially planar surface, thus affixing said encasement protective apparatus to the substantially planar surface.

4. An encasement protective apparatus according to claim 3, wherein said hatch further comprises a pivotal hinge affixed to a portion of said first end portion in combination with a means for removable engagement as between said hatch and said first end portion.

5. An encasement protective apparatus according to claim 4 wherein said means for removable engagement is constructed of a rotating planar latch that removably engages an angle affixed to said first end portion to be placed in a locked state and selectably rotating said latch disengages from said angle places said latch into an unlocked state.

6. An encasement protective apparatus according to claim 5, wherein said hatch further comprises an angled lip that covers said angle and said latch when said latch is in said locked state, which in effect hides said angle and said latch from an external environment to help increase security of said locked state.

7. An encasement protective apparatus according to claim 6, further comprising a plurality of said flexible collars that are disposed is a spaced apart manner along said longitudinal axis to operationally support the article at multiple points within said chamber.

8. An encasement protective apparatus according to claim 7 further comprising a plurality of said chambers that are positioned substantially parallel via said longwise axis to one another within said primary interior to operationally accommodate a plurality of articles.

9. An encasement protective apparatus according to claim 6 wherein said first end portion is larger than said second end portion, further said hatch, said flexible partition member, and said parsed portion of said flexible partition member are all sized and configured to match said larger first end portion, being operational to accommodate a larger portion of the article.

10. An encasement protective apparatus for enveloping a fishing rod and reel, the fishing rod and reel having a lengthwise axis, said apparatus comprising:
(a) a substantially rigid surrounding sidewall about a longitudinal axis, wherein said surrounding sidewall has a first end portion and an opposing second end portion wherein said longitudinal axis spanning therebetween, said surrounding sidewall also having an outer surface portion and an opposing inner surface portion, thereby said inner surface portion defining a primary interior;
(b) a tubular section having a longwise axis, said tubular section disposed within said primary interior, said tubular section having a tubular section exterior surface portion and an opposing tubular section interior surface portion, wherein said tubular section longwise axis is positioned to be substantially parallel to said longitudinal axis with said tubular section is disposed substantially from said first end portion to said second end portion, wherein said tubular section interior surface portion defines a tubular section interior;
(c) a flexible fill material disposed between said inner surface portion and said tubular section exterior surface portion, wherein operationally said flexible fill material dampens relative movement as between said rigid sidewall and said tubular section;
(d) a flexible collar that is slidably engaged to a portion of said tubular section interior in contact with said tubular section interior surface portion along said longitudinal axis, wherein said flexible collar has a collar aperture that removably encompasses a portion of the rod, wherein operationally said collar suspends the rod within said tubular section interior;
(e) a head element having an outermost surface and an opposing innermost surface wherein said head element is affixed to said second end portion such that structurally said outer surface portion extends to said outmost surface and said inner surface portion extends to said innermost surface wherein said flexible fill material extends to be adjacent to said innermost surface, wherein operationally said head element helps to retain the rod and reel along said longitudinal axis; and
(f) a door for removable engagement to said first end portion, wherein said door is positioned opposite of said head element in relation to said surrounding sidewall, said door having a parsed portion of said flexible fill material that faces said flexible fill material, wherein operationally said door further helps to retain the rod and reel along said longitudinal axis.

11. An encasement protective apparatus according to claim 10 wherein said surrounding sidewall generally forms a substantially rectangular prism shape, to further ease mounting on a vehicle roof of said encasement protective apparatus.

12. An encasement protective apparatus according to claim 11, wherein said sidewall further comprises a mounting angle beam with an extension axis, said mounting angle beam affixed to said outer surface portion of said surrounding sidewall wherein said angle beam extension axis is positioned substantially parallel to said longitudinal axis, wherein operationally said beam is adapted to affix to the vehicle roof, thus affixing said encasement protective apparatus to the vehicle roof.

13. An encasement protective apparatus according to claim 12, wherein said door further comprises a pivotal hinge affixed to a portion of said first end portion in combination with a means for removable engagement as between said door and said first end portion.

14. An encasement protective apparatus according to claim 13 wherein said means for removable engagement is constructed of a keyed rotating planar latch that removably engages an angle beam affixed to a portion of said first end portion to be placed in a locked state and selectably rotating said latch disengages from said angle beam places said latch into an unlocked state.

15. An encasement protective apparatus according to claim 14, wherein said door further comprises an angled lip beam that covers said angle beam and said latch when said latch is in said locked state, which in effect hides said angle beam and said latch from an external environment to help increase security of said locked state.

16. An encasement protective apparatus according to claim 15, further comprising a plurality of said flexible collars that are disposed is a spaced apart manner along said longitudinal axis to operationally support the rod at multiple points within said tubular section.

17. An encasement protective apparatus according to claim 16 further comprising a plurality of said tubular sections that are positioned substantially parallel to one another within said primary interior to operationally accommodate a plurality of the rod and reel assemblies.

18. An encasement protective apparatus according to claim 15 wherein said first end portion is larger than said second end portion, further said door, said flexible fill material, and said parsed portion of said flexible fill material are all sized and configured to match said larger first end portion, being operational to accommodate a larger portion of the reel portion of the rod and reel assembly.

19. An encasement protective apparatus for enveloping a fishing rod and reel, the fishing rod and reel having a lengthwise axis, said apparatus comprising:
(a) a substantially rigid surrounding sidewall about a longitudinal axis, wherein said surrounding sidewall has a first end portion and an opposing second end portion wherein said longitudinal axis spanning therebetween, said surrounding sidewall also having an outer surface portion and an opposing inner surface portion, thereby said inner surface portion defining a primary interior;
(b) a tubular section having a longwise axis, said tubular section disposed within said primary interior, said tubular section having a tubular section exterior surface portion and an opposing tubular section interior surface portion, wherein said tubular section longwise axis is positioned to be substantially parallel to said longitudinal axis with said tubular section being disposed substantially from said first end portion to said second end portion, wherein said tubular section interior surface portion defines a tubular section interior;
(c) a flexible fill material disposed between said inner surface portion and said tubular section exterior surface portion, wherein operationally said flexible fill material dampens relative movement as between said rigid sidewall and said tubular section;
(d) an adhesive foam that is affixed to a portion of said tubular section interior in contact with said tubular section interior surface portion along said longitudinal axis;
(e) a nested chamber disposed within said tubular section interior and supported by said adhesive foam;
(f) a flexible collar that is slidably engaged to a portion of an interior of said nested chamber along said longitudinal axis, wherein said flexible collar has a collar aperture that removably encompasses a portion of the rod, wherein operationally said collar suspends the rod within said nested chamber interior, further operationally said flexible collar, said adhesive foam, and said flexible fill material all act together to dampen relative movement as between said rigid sidewall and the rod to reduce possible damage to the rod;
(g) a head element having an outermost surface and an opposing innermost surface wherein said head element is affixed to said second end portion such that structurally said outer surface portion extends to said outmost surface and said inner surface portion extends to said innermost surface wherein said flexible fill material extends to be adjacent to said innermost surface, wherein operationally said head element helps to retain the rod and reel along said longitudinal axis; and
(h) a door for removable engagement to said first end portion, wherein said door is positioned opposite of said head element in relation to said surrounding sidewall, said door having a parsed portion of said flexible fill material that faces said flexible fill material, wherein operationally said door further helps to retain the rod and reel along said longitudinal axis.

20. An encasement protective apparatus according to claim 19, wherein said door further comprises a pivotal hinge affixed to a portion of said first end portion in combination with a keyed rotating planar latch that removably engages a channel affixed to a portion of said first end portion to be placed in a locked state and selectably rotating said latch disengages from said channel places said latch into an unlocked state, said door further comprises an angled lip beam that covers said channel when said latch is in said locked state, which in effect hides said channel and said latch from an external environment to help increase security of said locked state.

* * * * *